United States Patent
Shibata

(10) Patent No.: US 11,475,233 B2
(45) Date of Patent: Oct. 18, 2022

(54) IMAGE PROCESSING DEVICE AND IMAGE PROCESSING METHOD

(71) Applicant: NEC Corporation, Tokyo (JP)

(72) Inventor: Takashi Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 23 days.

(21) Appl. No.: 17/281,717

(22) PCT Filed: Oct. 10, 2018

(86) PCT No.: PCT/JP2018/037717
§ 371 (c)(1),
(2) Date: Mar. 31, 2021

(87) PCT Pub. No.: WO2020/075237
PCT Pub. Date: Apr. 16, 2020

(65) Prior Publication Data
US 2022/0004802 A1    Jan. 6, 2022

(51) Int. Cl.
*G06K 9/62* (2022.01)
*G06K 9/42* (2006.01)
(Continued)

(52) U.S. Cl.
CPC ........... *G06K 9/6215* (2013.01); *G06V 10/32* (2022.01); *G06V 10/34* (2022.01)

(58) Field of Classification Search
CPC ........ G06K 9/6215; G06T 7/00; G06V 10/32; G06V 10/34; G06V 10/754
See application file for complete search history.

(56) References Cited

U.S. PATENT DOCUMENTS 7,310,446 B2 * 12/2007 Kato ................... G06V 10/754
382/218
2007/0036405 A1    2/2007 Lienard et al.
(Continued)

FOREIGN PATENT DOCUMENTS

| JP | 2014-078095 A | 5/2014 |
| JP | 2015-179499 A | 10/2015 |
| JP | 2016-057793 A | 4/2016 |

OTHER PUBLICATIONS

P. Rogelj and S. Kovacic, "Local similarity measures for multimodal image matching," IWISPA 2000. Proceedings of the First International Workshop on Image and Signal Processing and Analysis, in conjunction with 22nd International Conference on Information Technology Interfaces. IEEE, 2000, pp. 81-86 (Year: 2000).*

(Continued)

*Primary Examiner* — Michael J Vanchy, Jr.
(74) *Attorney, Agent, or Firm* — Sughrue Mion, PLLC

(57) ABSTRACT

In order to ensure that similarity is detected with high accuracy, regardless of the types of images constituting a group of images to be evaluated for similarity, the image processing device includes difference calculation means 11 for deforming one of two or more images constituting an image group in one or more deforming ways, and calculating a degree of difference between the deformed image and the other image or images in the image group for each pixel using multiple ways for similarity evaluation, normalization means 12 for normalizing each degree of difference by each of the multiple ways for similarity evaluation, and difference integration means 15 for integrating normalized degrees of difference.

15 Claims, 5 Drawing Sheets

(51) Int. Cl.
  *G06K 9/44* (2006.01)
  *G06V 10/32* (2022.01)
  *G06V 10/34* (2022.01)

(56) References Cited

U.S. PATENT DOCUMENTS

2014/0098089 A1    4/2014  Sutou
2014/0301623 A1*  10/2014  Wang .................. A61B 5/0042
                                                              382/131
2016/0071285 A1*   3/2016  Shibata .................... G06T 7/30
                                                              382/103

OTHER PUBLICATIONS

International Search Report for PCT Application No. PCT/JP2018/037717, dated Jan. 15, 2019.
Soonmin Hwang, et al., "Multispectral Pedestrian Detection:Benchmark Dataset and Baseline", Proceedings of the IEEE Conference on Computer Vision and Pattern Recognition, 2015.
Asmaa Hosni, et al., "Fast cost-volume filtering for visual correspondence and beyond", IEEE Transactions on Pattern Analysis and Machine Intelligence, 35.2, 2013, pp. 504-511.
Marshall F. Tappen, William T. Freeman, "Comparison of graph cuts with belief propagation for stereo, using identical MRF parameters", Proceedings Ninth IEEE International Conference on Computer Vision, 2003.

* cited by examiner

IMAGE PROCESSING DEVICE AND IMAGE PROCESSING METHOD

This application is a National Stage Entry of PCT/JP2018/037717 filed on Oct. 10, 2018, the contents of all of which are incorporated herein by reference, in their entirety.

TECHNICAL FIELD

The present invention relates to an image processing device and an image processing method for determining the similarity of multiple types of images.

BACKGROUND ART

There is a multimodal information processing method inputting multiple forms of information and performing information processing based on the input information.

In the field of image processing, it is known that combining use of information of multiple modalities (for example, visible image and far-infrared image) is better than using only information of a single modal (for example, visible image), as it can respond to more various scenes and improve the accuracy of image processing. For example, by integrating a visible image taken with a general camera and a non-visible image taken with a far-infrared camera, etc., the visibility of objects and the others that are difficult to capture with each single image can be improved.

Hereinafter, a far-infrared image is taken as an example of an image that is different from a visible image. In general, a camera that outputs far-infrared images (referred to as a different modality) is located independently from a camera that outputs visible images. Therefore, disparity occurs between the image output from the different modality and the visible image. In other words, the position of an object in the visible image and the position of the object in the far-infrared image are shifted.

Non-patent literature 1 describes a method to avoid the problem of position shifting by using disparity-removed data from a special device.

Non-patent literature 2 discloses a method for obtaining disparity and a deformation amount by a process that calculates a similarity of a pair (image pair) of one image and another image that has been translated in the x-direction, and by using a filter process and an optimization process for high quality. As the similarity, sum of absolute differences of pixel values, mutual information, normalized cross-correlation, etc. are used.

Non-patent literature 2 also describes a method that generates a cost volume for each pixel, performs filtering on the cost volume, and adopts the disparity that gives the minimum cost. In the case of focusing on disparity, the cost volume is a set of costs distributed in the horizontal, vertical, and disparity directions. The cost that represent the extent to which the pixel values for the corresponding pixels are different between a standard image and a reference image.

CITATION LIST

Non-Patent Literature

Non-patent Literature 1: Soonmin Hwang, et al., "Multi-spectral Pedestrian Detection:Benchmark Dataset and Baseline", Proceedings of the IEEE Conference on Computer Vision and Pattern Recognition, 2015
Non-patent Literature 2: Asmaa Hosni, et al., "Fast cost-volume filtering for visual correspondence and beyond", IEEE Transactions on Pattern Analysis and Machine Intelligence, 35.2, 2013, pp. 504-511
Non-patent Literature 3: Marshall F. Tappen, William T. Freeman, "Comparison of graph cuts with belief propagation for stereo, using identical MRF parameters", Proceedings Ninth IEEE International Conference on Computer Vision, 2003

SUMMARY OF INVENTION

Technical Problem

If it is tried to realize an image processing device that implements the method described in the Non-patent literature 1, a special device. is required This makes the image processing device expensive.

As mentioned above, when implementing the method described in Non-patent literature 2, indices such as absolute sum of pixel values, mutual information, normalized cross-correlation, etc. are used as similarity, but the best method depends on the image for which the similarity is to be detected. For example, when an image pair is constituted with two visible images, the absolute sum of pixel values is an effective indicator. However, when an image pair is constituted with a visible image and a far-infrared image, the absolute sum of pixel values is not an effective indicator. This is because, in general, the value range of the visible image is different from that of the far-infrared image, therefore the sum of absolute differences between the pixel values of the visible image and those of the far-infrared image becomes a large value.

It is an object of the present invention to provide an image processing device and an image processing method capable of detecting similarity with high accuracy, regardless of the types of images constituting a group of images to be evaluated for similarity.

Solution to Problem

An image processing device according to the present invention, includes difference calculation means for deforming one of two or more images constituting an image group in one or more deforming ways, and calculating a degree of difference between the deformed image and the other image or images in the image group for each pixel using multiple ways for similarity evaluation, normalization means for normalizing each degree of difference by each of the multiple ways for similarity evaluation, and difference integration means for integrating normalized degrees of difference.

An image processing method according to the present invention, includes deforming one of two or more images constituting an image group in one or more deforming ways, and calculating a degree of difference between the deformed image and the other image or images in the image group for each pixel using multiple ways for similarity evaluation, normalizing each degree of difference by each of the multiple ways for similarity evaluation, and integrating normalized degrees of difference.

An image processing program according to the present invention, causing a computer to execute a process of deforming one of two or more images constituting an image group in one or more deforming ways, and calculating a degree of difference between the deformed image and the other image or images in the image group for each pixel using multiple ways for similarity evaluation, a process of normalizing each degree of difference by each of the multiple ways for similarity evaluation, and a process of integrating normalized degrees of difference.

Advantageous Effects of Invention

According to this invention, the similarity is detected with high accuracy regardless of the type of images constituting a group of images to be evaluated for similarity.

DESCRIPTION OF EMBODIMENTS

Hereinafter, example embodiments of the present invention are described with reference to the drawings.

Figure 1:
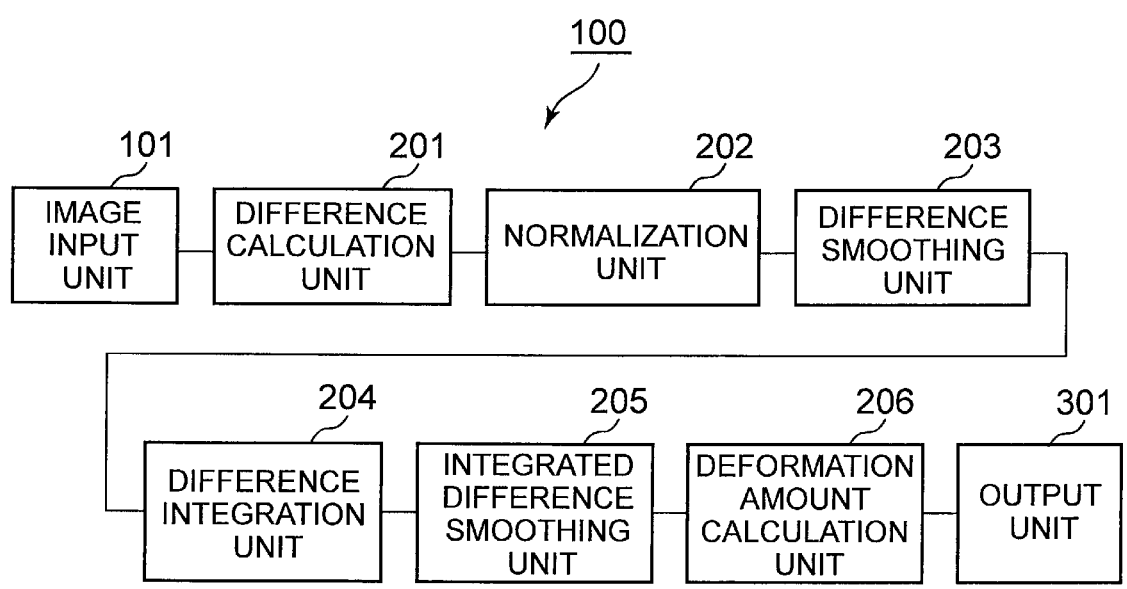
FIG. 1 It depicts a block diagram showing a configuration of the image processing device.

FIG. 1 is a block diagram showing a configuration of the image processing device. The image processing device 100 comprises an image input unit 101, a difference calculation unit 201, a normalization unit 202, a difference smoothing unit 203, a difference integration unit 204, an integrated difference smoothing unit 205, a deformation amount calculation unit 206, and an output unit 301.

The image input unit 101 inputs a plurality of images obtained by one or more cameras (not shown) or sensors (not shown). The plurality of images constitutes a group of images that is a target for obtaining disparity and a deformation amount. One or more images or measurements obtained by a camera or a sensor for measurement are input to the image input unit 101. The input images are not limited to visible images and measurements from visible light cameras and visible light sensors. For example, images obtained by a camera or sensor other than from a visible light camera or visible light sensor may be input. As an example, a temperature image or depth image may be input.

The image input unit 101 may apply image processing to the input image, such as tone mapping, super-resolution, blur removal, image fusion, etc., for the purpose of removing noise, etc.

The difference calculation unit 201 deforms one of images input to the image input unit 101 in one or more deforming ways. The difference calculation unit 201 further evaluates the degree of similarity between the deformed image and the other images. As an example, the difference calculating unit 201 calculates the difference (or similarity) of the images using multiple similarity calculation methods (methods for similarity evaluation), such as normalized cross-correlation between images, sum of absolute differences, and phase only correlation, after shifting images other than one of the image groups. Then, in this example embodiment, the difference calculation unit 201 calculates the cost volume, which is a value corresponding to the degree of difference.

The normalization unit normalizes the cost volume based on the differences calculated by each similarity calculation method using a voting method.

The difference smoothing unit 203 smooths the respective normalized cost volumes.

The difference integration unit 204 integrates the cost volumes smoothed by the difference smoothing unit 203.

The integrated difference smoothing unit smooths the integrated difference (integrated difference).

The deformation amount calculation unit 206 obtains the disparity and a deformation amount from the smoothed difference by searching for the minimum value for each pixel.

The output unit 301 outputs the disparity between images and the deformation amount calculated by the deformation amount calculation unit 206.

Figure 2:
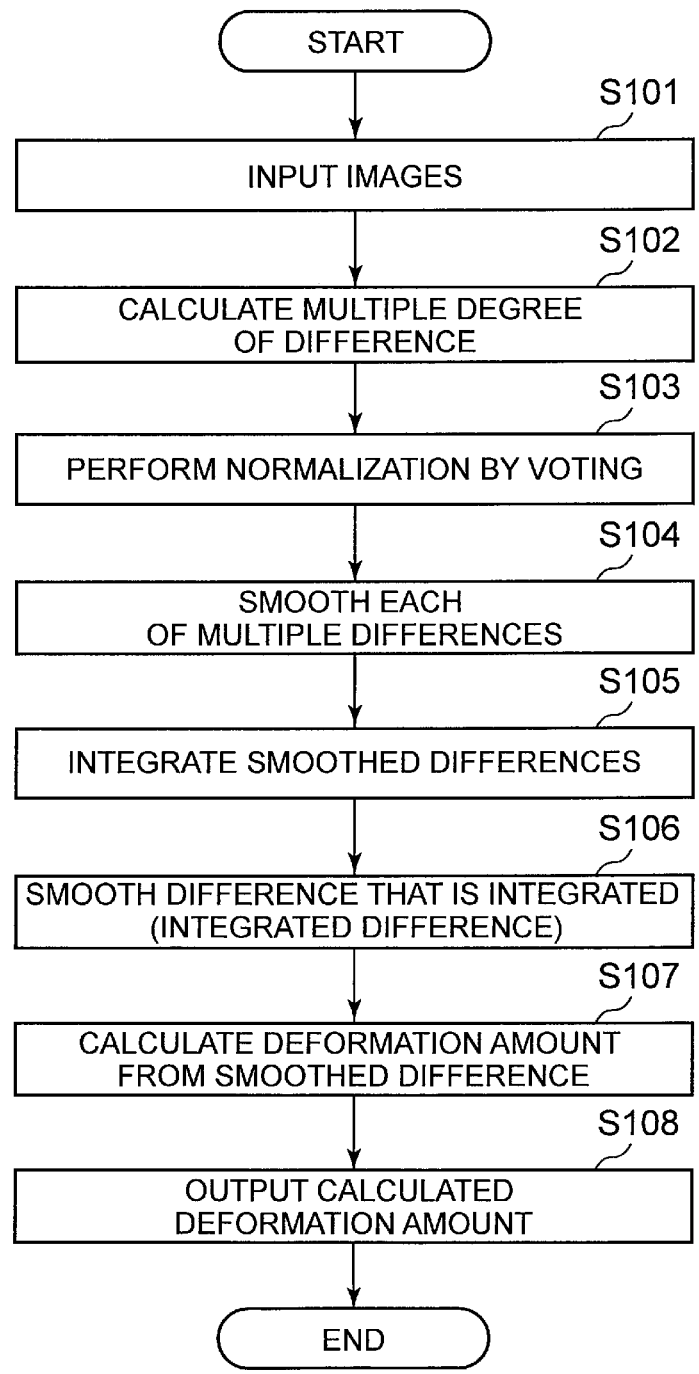
FIG. 2 It depicts a flowchart showing an operation of the image processing device.

Next, the operation of the image processing device 100 will be described with reference to the flowchart in FIG. 2.

The image input unit 101 inputs a plurality of images or measurements (step S101). The image input unit 101 stores the input images or measurements in a memory (not shown) or the like. The images input by the image input unit 101 are not limited to images from a camera. For example, the results of processing in the middle of deep learning may be input as multi-channel images (multiple images). Vector data (velocity field, density field, etc.) calculated by a numerical simulation, etc. also may be input as multi-channel images (multiple images).

The difference calculation unit 201 transforms one of the plurality of images input to the image input unit 101 using one or more transformation methods. Here, the case, where two images are included in an image group, is taken as an example. That is, an image pair is input to the image input unit 101. The difference calculation unit 201 deforms one of the images that constitute the image pair. The difference calculation unit 201 calculates the degree of difference between the deformed image and the other image (step S102).

The following is a specific example of image deformation and calculation of the degree of difference.

The image of an image pair that is not deformed is called the standard image. The image to be deformed is called the reference image. Hereinafter, the standard image is denoted by $I(j)$, where j is a pixel (specifically, a pixel position). The reference image is denoted by $J(j)$.

The difference calculation unit 201 applies geometric deformation, such as translation, to the reference image $J(j)$. For example, when a translation is applied, the difference calculation unit 201 calculates the amount of translation as "1 pixel to the right", "2 pixels to the right", "3 pixels to the right", "no deformation" (no movement)", "1 pixel to the left", "2 pixels to the left", "3 pixels to the left", etc. In this case, for a single reference image, multiple types of images are generated in seven different deforming ways (including "no deformation") by deformation. The difference calculation unit 201 stores the generated deformed images in a memory (not shown).

Hereinafter, the deformed reference image is referred to as the deformed image. The deformed image is denoted by $K(j, n)$, where n is a value to identify the way of deformation (specifically, a deformation amount). In the above example, n is one of the values from 1 to 7, corresponding to each of "one pixel to the right", "two pixels to the right", "three pixels to the right", "no deformation", "one pixel to the left", "two pixels to the left", and "three pixels to the left".

The transformation performed by the difference calculation unit 201 is not limited to translation. For example, the difference calculation unit 201 may transform the reference image using a homography transformation, an affine transformation, or a Helmert transformation. The difference calculation unit 201 may also prepare multiple types of parameters that characterize each transformation (for example, eight parameters in the case of the homography transformation) and generate multiple types of transformed images by transforming the image for each parameter.

The difference calculation unit 201 may, for example, generate a transformed image by giving each pixel a plurality of different position shift amounts individually and transforming the image for each of the plurality of position shift amounts.

The difference calculation unit 201 may select a deformation method according to the characteristics of the installed cameras. As an example, if the cameras are aligned horizontally, a deformed image in which each pixel is translated around the epipolar lines corresponding to these camera arrangements may be used.

The difference calculation unit calculates the degree of difference (or similarity) between each generated deformed image and the standard image.

The difference calculation unit 201 calculates the degree of the difference (or similarity) of the images using multiple similarity calculation methods, such as normalized cross-correlation, sum of absolute differences, and phase only correlation between the standard image I(j) and the transformed image K(j, k), for example. The difference calculation unit 201 calculates the cost volume, which is the value corresponding to the difference.

The difference calculation unit 201 calculates the cost volume C(j, k), for example, as follows. k indicates a deformation amount (for example, a shift amount).

Equation (1) is an example of a representation of the cost volume C(j, k). In equation (1), (x, y) corresponds to the two-dimensional representation of pixel j. I represents one image (reference image) and J represents the other (standard image). $\alpha$ is a parameter to adjust the balance between the first and second terms on the right side. $\text{grad}_x$ represents the gradient of the pixel value in the x direction. $T_1, T_2$ represent the cost censoring values. T1 and T2 indicate the cost truncation values.

[Math. 1]

$$C(j,k) = (1-\alpha)\cdot\min[\|J_{x-k,y} - I_{x,y}\|, T_1] + \alpha\cdot\min[\|\text{grad}_x J_{x-k,y} - \text{grad}_x I_{x,y}\|, T_2]$$

$$j = [x, y] \qquad (1)$$

The cost volume according to the similarity calculation method is described as C(j, k, l). It should be noted that l is a value to identify the similarity calculation method. For example, if three types of similarity calculation methods are used, for example normalized cross-correlation, sum of absolute differences, and phase only correlation, then l will be one of the values 1 to 3.

The normalization unit 202, for example, normalizes the cost volume C(j, k, l) by the voting method, using the following procedure (step S103).

Figure 3:
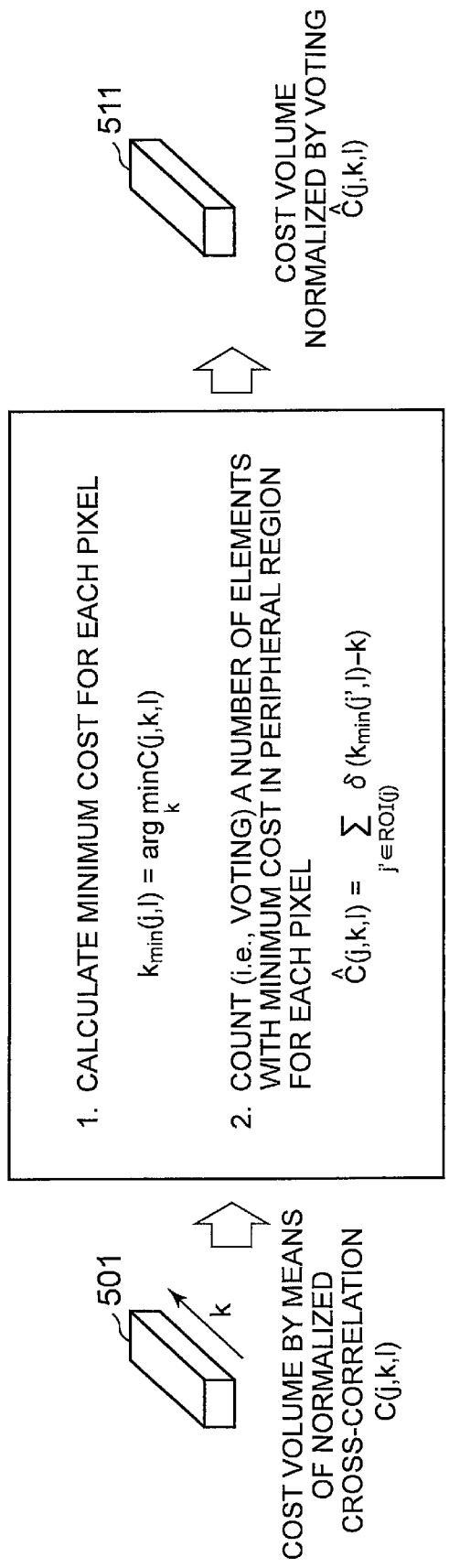
FIG. 3 It depicts an explanatory diagram showing a function of the normalization unit.

FIG. 3 illustrates an explanatory diagram showing a function of the normalization unit 202.

First, for each of the cost volumes C(j, k, l) (three in the above example), the normalization unit 202 calculates the minimum cost in the k direction k (deformation amount) for each pixel j, as shown in equation (2). FIG. 3 shows an example in which the difference calculation unit 201 calculates the cost volume C(j, k, l) 501 corresponding to the difference using normalized cross-correlation.

[Math. 2]

$$k_{min}(j, l) = \arg\min_k C(j, k, l) \qquad (2)$$

The normalization unit 202 then generates a normalized cost volume by voting.

In this example embodiment, pixel j' in the peripheral region of pixel j is focused on. Then, the normalization unit 202 sets the value expressed in equation (3) as the normalized cost volume when the peripheral region of pixel j is set as ROI(j). In other words, the normalization unit 202 counts a number of elements with the minimum cost in the peripheral region for each pixel j, that is, the elements with the minimum cost are voted, and the number (number of votes) is the normalized cost volume by voting (refer to the normalized cost volume 511 in FIG. 3).

[Math. 3]

$$\hat{C}(j, k, l) = \sum_{j' \in ROI(j)} \delta(k_{min}(j', l) - k) \qquad (3)$$

In equation (3), $\delta(\ )$ is Dirac's delta function. When using equation (3), the normalized cost volume is represented by the number of pieces where $\delta(k_{min}(j', l))$ is equal to k in the peripheral region ROI(j).

The difference smoothing unit 203 smooths each normalized difference (step S104). In this example embodiment, the degree of difference is reflected in the cost volume C(j, k, l). Therefore, the difference smoothing unit 203 specifically smooths each normalized cost volume.

The difference smoothing unit 203 smooths the normalized cost volume (in the j direction) in an image space.

The difference smoothing unit 203 can use a variety of methods for smoothing. As an example, the difference smoothing unit 203 can use a smoothing filter in an image space as described in the non-patent literature 2 (specifically, a guided filter in the non-patent literature 2). The difference smoothing unit 203 may also spatially smooth the normalized cost volume using optimization methods such as graph cuts as described in non-patent literature 3.

The smoothed cost volume is denoted by D(j, k, l).

In this example embodiment, the difference smoothing unit 203 outputs the normalized cost volume to the difference integration unit 204 after smoothing it, but the cost volume calculated by the difference calculation unit 201 may be input directly to the difference integration unit 204 for the purpose of improving processing speed, etc.

The difference integration unit 204 integrates the smoothed differences (step S105). In this example embodiment, the degree of difference is reflected in the cost volume C(j, k, l). Therefore, the difference integration unit 204 specifically integrates the smoothed cost volume D(j, k, l). The integrated cost volume (integrated cost volume) is denoted by E(j, k). The difference integration unit 204 uses, for example, a weighted linear sum as shown in equation (4) below. In equation (4), the weights $w_l$ are set for each cost volume.

[Math. 4]

$$E(j, k) = \sum_{l} w_l \cdot D(j, k, l) \quad (4)$$

The weights $w_l$ are set in advance, for example, by a user of the image processing system. However, the weights $w_l$ may also be set by machine learning or other methods using pre-derived experimental data or other data.

The difference integration unit 204 may integrate the smoothed cost volume D(j, k, l) using a method other than weighted linear sum. For example, the smoothed cost volume D(j, k, l) may be integrated using a softmax function or the like. Specifically, the difference integration unit 204 may integrate the smoothed cost volume D(j, k, l) using a method such that the larger the value of D(j, k, l), the larger the value of E(j, k) for the integrated cost volume.

The integrated difference smoothing unit 205 smooths the difference that is integrated (integrated difference) in image space (step S106). In this example embodiment, the degree of difference is reflected in the cost volume. Therefore, the integrated difference smoothing unit 205 specifically smooths the integrated cost volume E(j, k).

The integrated difference smoothing unit 205 smooths the integrated cost volume E(j, k) in the image space (in the j direction). The smoothed integrated cost volume E(j, k) is defined as the cost volume F(j, k).

The integrated difference smoothing unit 205 can use a variety of methods for smoothing. As an example, the integrated difference smoothing unit 205 can use a smoothing filter in image space, such as the one described in non-patent literature 2. The integrated difference smoothing unit 205 can also spatially smooth the integration cost volume E(j, k) using optimization methods such as graph cuts as described in non-patent literature 3.

In this example embodiment, the integrated difference smoothing unit 205 outputs the integration cost volume E(j, k) to the deformation amount calculation unit 206 after smoothing it, but the integration cost volume E(j, k) calculated by the difference integration unit 204 may be input directly to the deformation amount calculation unit 206 for the purpose of improving processing speed, etc. However, for the purpose of improving processing speed, the integrated cost volume E(j, k) calculated by the difference integration unit 204 may be input directly to the deformation amount calculation unit 206.

The deformation amount calculation unit 206 calculates the disparity and the deformation amount from the smoothed difference by searching for the minimum value for each pixel j (step S107).

For example, the deformation amount calculation unit 206 calculates the k that minimizes the integration cost volume E(j, k) at each pixel j, and calculates the deformation amount and the disparity corresponding to the k as the deformation amount and the disparity between images. As an example, the deformation amount calculation unit 206 calculates the k that minimizes the integration cost volume E(j, k) according to the formula (5).

[Math. 5]

$$k_{min} = \arg\min_{k} F(j, k) \quad (5)$$

Assume that seven types of deformation are applied to the reference image, namely, "one pixel to the right" (k=1), "two pixels to the right" (k=2), "three pixels to the right" (k=3), "no deformation" (k=4), "one pixel to the left" (k=5), "two pixels to the left" (k=6), and "three pixels to the left" (k=7). Then, if $k_{min}$=3 is obtained as the k that minimizes the integrated cost volume E(j, k), the deformation amount calculation unit 206 sets "3 pixels to the right" as the disparity between images and the deformation amount.

The output unit 301 outputs the disparity between images and the deformation amount calculated by the deformation amount calculation unit 206 (step S108).

Figure 4:
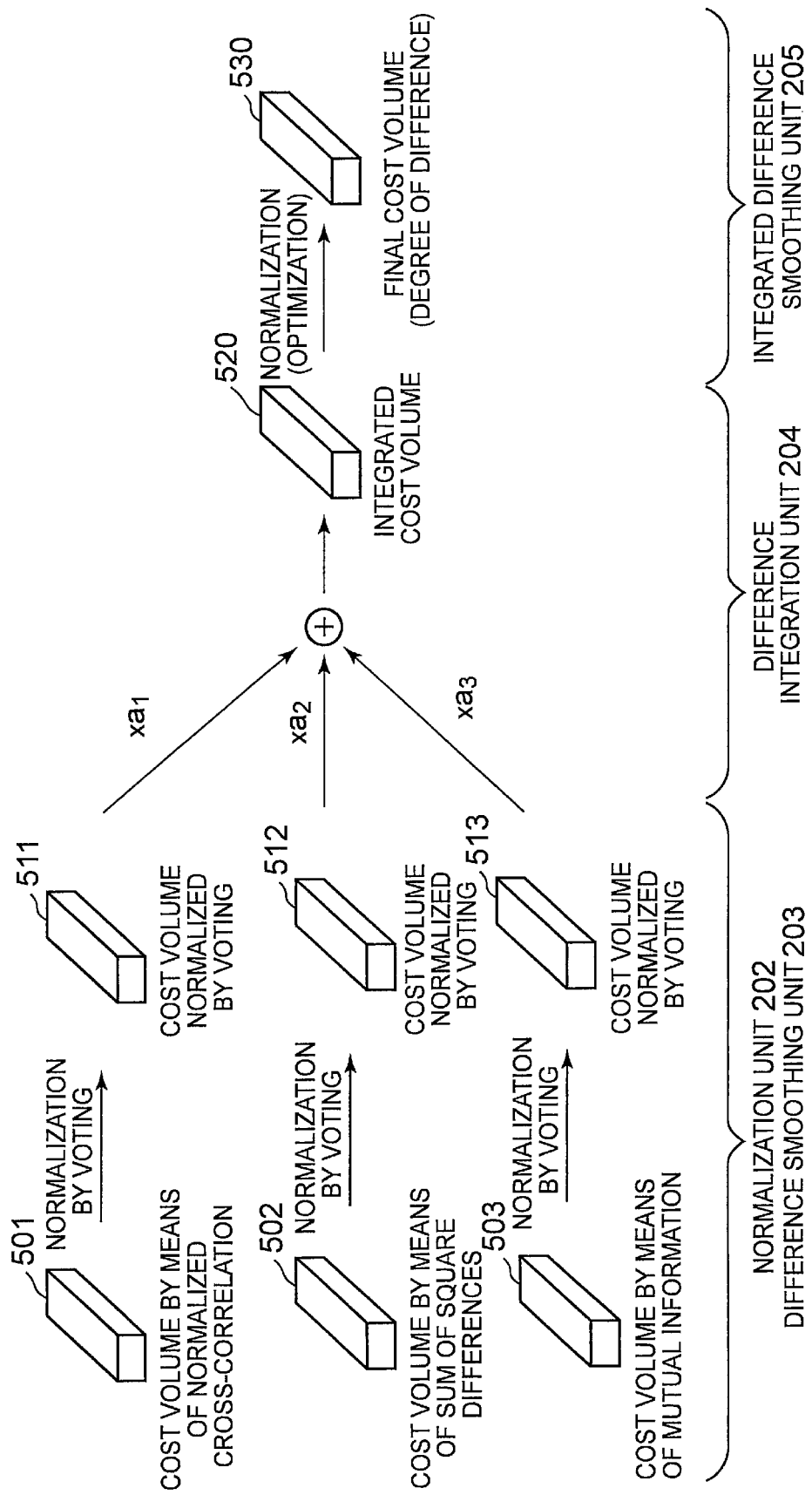
FIG. 4 It depicts an explanatory diagram showing an overview of the image processing method.

Next, an overview of the image processing method is explained referring to an explanatory diagram in FIG. 4.

FIG. 4 shows an example in which the difference calculation unit 201 uses normalized cross-correlation, sum of square differences, and mutual information to calculate the difference (cost volume C(j, k, l)) in the process of step S102. Namely, the difference calculation unit 201 calculates cost volume 501 by normalized cross-correlation, cost volume 502 by sum of square differences, and cost volume 503 by mutual information.

As described above, the normalization unit 202 normalizes the cost volumes 501, 502, 503 by voting in the process of step S103, and generates the normalized cost volumes 511, 512, 513.

In the process of step S105, the difference integration unit 204 integrates the normalized cost volumes 511, 512, and 513 to generate the integrated cost volume 520. In FIG. 4, $a_1$, $a_2$, $a_3$ are illustrated as weights $w_l$.

As described above, the normalized cost volumes 511, 512, 513 may be smoothed by the difference smoothing unit 203.

In the process of step S106, the integrated difference smoothing unit 205 smooths the integration cost volume 520 to become the final cost volume 530.

As described above, in this example embodiment, the difference calculation unit 201 evaluates the degree of difference between images constituting an image pair using multiple methods. In the above example, the difference calculation unit 201 calculates a cost volume based on the difference between each method. In addition, the normalization unit 202 normalizes the respective degrees of difference (in the above example, the cost volume). In the above example, the normalization unit 202 normalizes the cost volume by voting.

The image processing device uses multiple types of difference degrees together, and the normalized multiple difference degrees are integrated in the difference degree integration unit 204 by linear sum or other means. At that time, the normalization unit 202 normalizes each difference by voting, so that the value ranges of each difference are aligned and integrated equally. As a result, the similarity of images can be determined with high accuracy regardless of the types of images that constitutes the image pair. In addition, since it does not depend on the types of images that constitutes the image pair, the versatility of the image processing device is improved. In other words, whether the image pair is constituted with two visible images, a visible image and a far-infrared image, or a combination of other types of images, the image processing device can determine the similarity of the images with high accuracy.

In the above example embodiment, the case is mainly described where the image processing device determines the similarity of images by calculating disparity and a deformation amount for an image pair constituted with two images, but the image processing device can also determine the similarity of images by calculating disparity and deformation for three or more images.

Although the components in the above example embodiment may be configured with a piece of hardware or a piece of software. Alternatively, the components may be configured with a plurality of pieces of hardware or a plurality of pieces of software. Further, part of the components may be configured with hardware and the other part with software.

The functions (processes) in the above example embodiments may be realized by a computer having a processor such as a central processing unit (CPU), a memory, etc. For example, a program for performing the method (processing) in the above example embodiments may be stored in a storage device (storage medium), and the functions may be realized with the CPU executing the program stored in the storage device.

Figure 5:
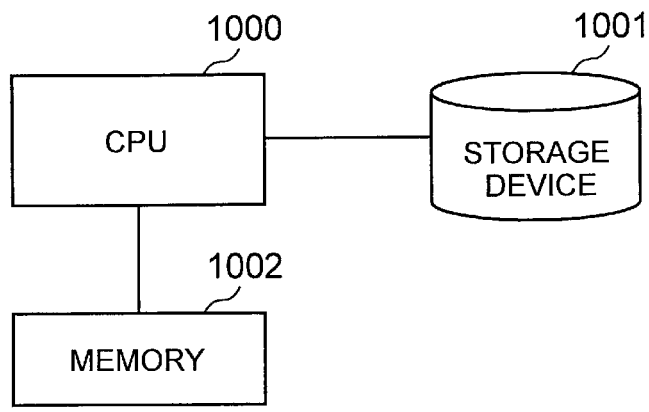
FIG. 5 It depicts a block diagram showing an example of a computer with a CPU.

FIG. 5 is a a block diagram showing an example of a computer with a CPU. The computer is implemented in an image processing. The CPU 1000 executes processing in accordance with a program stored in a storage device 1001 to realize the functions in the above example embodiment. That is, the computer realizes the functions of the difference calculation unit 201, the normalization unit 202, the difference smoothing unit 203, the difference integration unit 204, the integrated difference smoothing unit 205, and the deformation amount calculation unit 206 in the image processing device 100 shown in FIG. 1.

The storage device 1001 is, for example, a non-transitory computer readable medium. The non-transitory computer readable medium includes various types of tangible storage media. Specific examples of the non-transitory computer readable medium include magnetic storage media (for example, flexible disk, magnetic tape, hard disk drive), magneto-optical storage media (for example, magneto-optical disc), compact disc-read only memory (CD-ROM), compact disc-recordable (CD-R), compact disc-rewritable (CD-R/W), and semiconductor memories (for example, mask ROM, programmable ROM (PROM), erasable PROM (EPROM), flash ROM).

The program may be stored in various types of transitory computer readable media. The transitory computer readable medium is supplied with the program through, for example, a wired or wireless communication channel, or, via electric signals, optical signals, or electromagnetic waves.

A memory 1002 is a storage means implemented by a random access memory (RAM), for example, and temporarily stores data when the CPU 1000 executes processing. A conceivable mode is that the program held in the storage device 1001 or in a transitory computer readable medium is transferred to the memory 1002, and the CPU 1000 executes processing on the basis of the program in the memory 1002.

Figure 6:
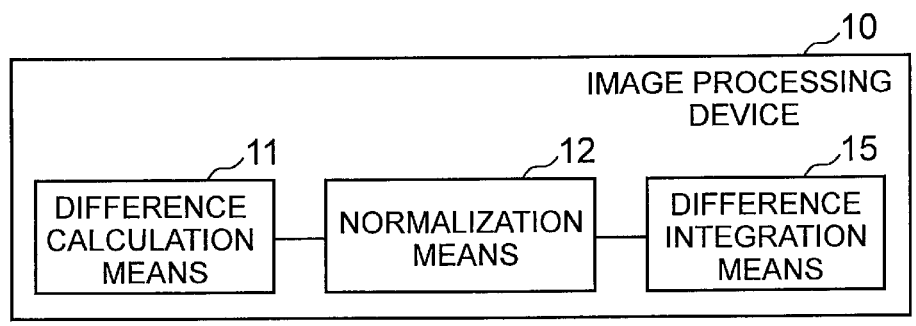
FIG. 6 It depicts a block diagram showing the main part of the image processing device.

FIG. 6 shows a block diagram of the main part of the image processing device. The image processing device 10 shown in FIG. 6 comprises difference calculation means 11 (in the example embodiment, realized by the difference calculation unit 201) for deforming (for example, shifting each pixel by a plurality of predetermined amounts) one of two or more images constituting an image group in one or more deforming ways (for example, two or more among normalized cross-correlation, sum of absolute differences, sum of square differences, phase only correlation, mutual information, etc.), and calculating a degree of difference between the deformed image and the other image or images in the image group for each pixel using multiple ways for similarity evaluation, normalization means 12 (in the example embodiment, realized by the normalization unit 202) for normalizing each degree of difference by each of the multiple ways for similarity evaluation, and difference integration means 15 (in the example embodiment, realized by the difference integration unit 204) for integrating normalized degrees of difference.

Figure 7:
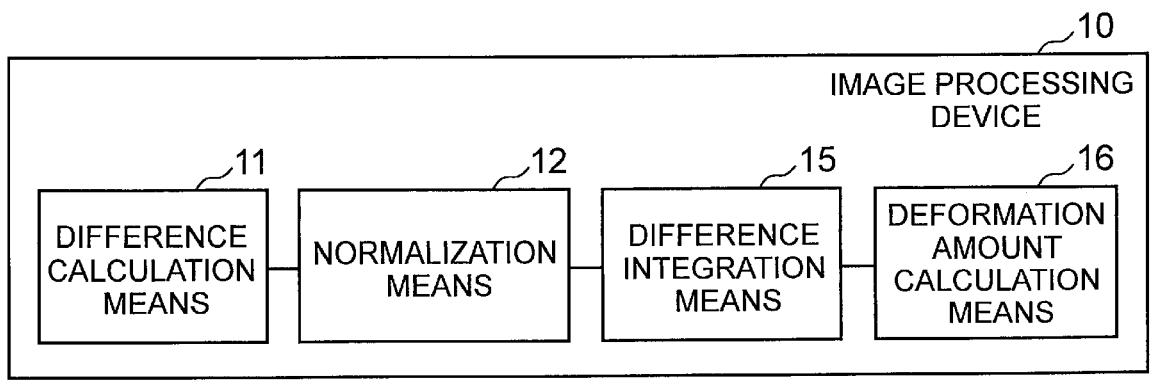
FIG. 7 It depicts a block diagram showing the main part of the image processing device in another aspect.

As shown in FIG. 7, the image processing device 10 may further comprises the deformation amount calculation means 16 (in the example embodiment, realized by the deformation amount calculation unit 206) for setting a deformation amount that minimizes the integrated degree of difference as a deformation amount of the image.

The image processing device 10 may further comprises integrated difference smoothing means (in the example embodiment, realized by the integrated difference smoothing unit 205) for smoothing the integrated degree of difference to output smoothed integrated degree of difference to the deformation amount calculation means 16.

The image processing device 10 may further comprises difference smoothing means (in the example embodiment, realized by the difference smoothing unit 203) for smoothing each normalized degree of difference to output smoothed normalized degrees of difference to the difference integration means 15.

A part of or all of the above example embodiment may also be described as, but not limited to, the following supplementary notes.

(Supplementary note 1) An image processing device comprising:

difference calculation means for deforming one of two or more images constituting an image group in one or more deforming ways, and calculating a degree of difference between the deformed image and the other image or images in the image group for each pixel using multiple ways for similarity evaluation, normalization means for normalizing each degree of difference by each of the multiple ways for similarity evaluation, and difference integration means for integrating normalized degrees of difference.

(Supplementary note 2) The image processing device according to Supplementary note 1, wherein the normalization means normalizes the degree of difference by voting.

(Supplementary note 3) The image processing device according to Supplementary note 1 or 2, further comprising:

deformation amount calculation means for setting a deformation amount that minimizes the integrated degree of difference as a deformation amount of the image.

(Supplementary note 4) The image processing device according to Supplementary note 3, further comprising:

integrated difference smoothing means for smoothing the integrated degree of difference to output smoothed integrated degree of difference to the deformation amount calculation means.

(Supplementary note 5) The image processing device according to any one of Supplementary notes 1 to 4, further comprising:

difference smoothing means for smoothing each normalized degree of difference to output smoothed normalized degrees of difference to the difference integration means.

(Supplementary note 6) An image processing method comprising:

deforming one of two or more images constituting an image group in one or more deforming ways, and calculating a degree of difference between the deformed image and the other image or images in the image group for each pixel using multiple ways for similarity evaluation, normalizing each degree of difference by each of the multiple ways for similarity evaluation, and integrating normalized degrees of difference.

(Supplementary note 7) The image processing method according to Supplementary note 6, wherein the degree of difference is normalizes by voting.

(Supplementary note 8) The image processing method according to Supplementary note 6 or 7, further comprising:

setting a deformation amount that minimizes the integrated degree of difference as a deformation amount of the image.

(Supplementary note 9) The image processing method according to Supplementary note 8, further comprising:

smoothing the integrated degree of difference before deriving the deformation amount of the image.

(Supplementary note 10) The image processing method according to any one of Supplementary notes 6 to 9, further comprising:

smoothing each normalized degree of difference before integrating each of the normalized degrees of difference.

(Supplementary note 11) An image processing program causing a computer to execute:

a process of deforming one of two or more images constituting an image group in one or more deforming ways, and calculating a degree of difference between the deformed image and the other image or images in the image group for each pixel using multiple ways for similarity evaluation, a process of normalizing each degree of difference by each of the multiple ways for similarity evaluation, and a process of integrating normalized degrees of difference.

(Supplementary note 12) The image processing program according to Supplementary note 11, causing the computer to execute normalizing the degree of difference by voting.

(Supplementary note 13) The image processing program according to Supplementary note 11 or 12, causing the computer to further execute a process of setting a deformation amount that minimizes the integrated degree of difference as a deformation amount of the image.

(Supplementary note 14) The image processing program according to Supplementary note 13, causing the computer to further execute a process of smoothing the integrated degree of difference before deriving the deformation amount of the image.

(Supplementary note 15) The image processing program according to any one of Supplementary notes 11 to 14, causing the computer to further execute a process of smoothing each normalized degree of difference before integrating each of the normalized degrees of difference.

While the present invention has been described above with reference to the example embodiment, the present invention is not limited to the aforementioned example embodiment. Various changes understandable by those skilled in the art within the scope of the present invention can be made for the arrangements and details of the present invention.

REFERENCE SIGNS LIST 10 image processing device
11 difference calculation means
12 normalization means
15 difference integration means
16 deformation amount calculation means
100 image processing device
101 image input unit
201 difference calculation unit
202 normalization unit
203 difference smoothing unit
204 difference integration unit
205 integrated difference smoothing unit
206 deformation amount calculation unit
301 output unit
1000 CPU
1001 storage device
1002 memory

What is claimed is:

1. An image processing device comprising:
a memory storing a software component; and
at least one processor configured to execute the software component to perform:
deforming one of two or more images constituting an image group in one or more deforming ways, and calculating a degree of difference between the deformed image and the other image or images in the image group for each pixel using multiple ways for similarity evaluation,
normalizing each degree of difference by each of the multiple ways for similarity evaluation, and
integrating normalized degrees of difference.

2. The image processing device according to claim 1, wherein
the at least one processor configured to execute the software component to perform normalizing the degree of difference by voting.

3. The image processing device according to claim 1, wherein
the at least one processor is further configured to execute the software component to perform:
setting a deformation amount that minimizes the integrated degree of difference as a deformation amount of the image.

4. The image processing device according to claim 3, wherein
the at least one processor is further configured to execute the software component to perform:
smoothing the integrated degree of difference to output smoothed integrated degree of difference to the deformation amount calculation means.

5. The image processing device according to claim 1, wherein
the at least one processor is further configured to execute the software component to perform:
smoothing each normalized degree of difference to output smoothed normalized degrees of difference to the difference integration means.

6. A computer-implemented image processing method comprising:
deforming one of two or more images constituting an image group in one or more deforming ways, and calculating a degree of difference between the deformed image and the other image or images in the image group for each pixel using multiple ways for similarity evaluation,
normalizing each degree of difference by each of the multiple ways for similarity evaluation, and
integrating normalized degrees of difference.

7. The computer-implemented image processing method according to claim 6, wherein
the degree of difference is normalizes by voting.

8. The computer-implemented image processing method according to claim 6, further comprising:

setting a deformation amount that minimizes the integrated degree of difference as a deformation amount of the image.

9. The computer-implemented image processing method according to claim 8, further comprising:
smoothing the integrated degree of difference before deriving the deformation amount of the image.

10. The computer-implemented image processing method according to claim 6, further comprising:
smoothing each normalized degree of difference before integrating each of the normalized degrees of difference.

11. A non-transitory computer readable recording medium storing an image processing program which, when executed by a processor, performs:
deforming one of two or more images constituting an image group in one or more deforming ways, and calculating a degree of difference between the deformed image and the other image or images in the image group for each pixel using multiple ways for similarity evaluation,
normalizing each degree of difference by each of the multiple ways for similarity evaluation, and
integrating normalized degrees of difference.

12. The computer readable recording medium according to claim 11, wherein when executed by the processor, the image processing program performs
normalizing the degree of difference by voting.

13. The computer readable recording medium according to claim 11, wherein when executed by the processor, the image processing program further performs
setting a deformation amount that minimizes the integrated degree of difference as a deformation amount of the image.

14. The image processing program according to claim 13, wherein when executed by the processor, the image processing program further performs
smoothing the integrated degree of difference before deriving the deformation amount of the image.

15. The image processing program according to claim 11, wherein when executed by the processor, the image processing program further performs
smoothing each normalized degree of difference before integrating each of the normalized degrees of difference.

* * * * *